(No Model.)
S. C. C. CURRIE.
ELECTRODE FOR SECONDARY BATTERIES.
No. 444,392. Patented Jan. 6, 1891.
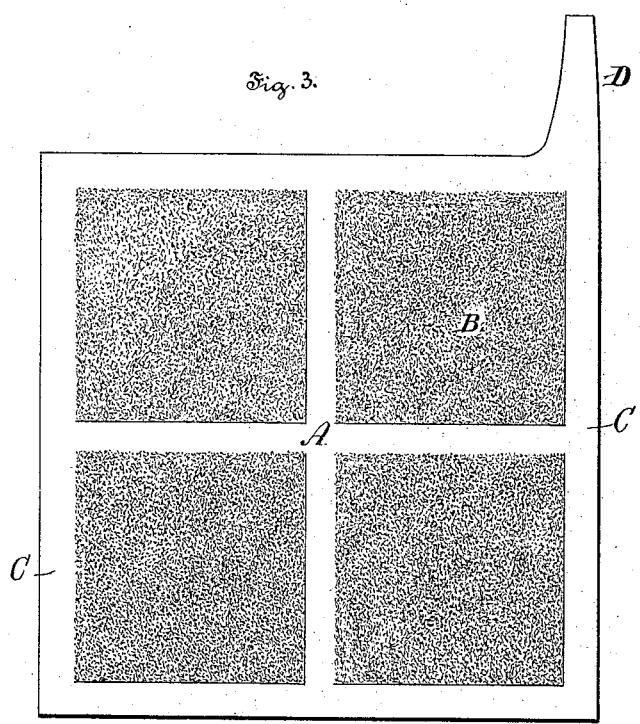
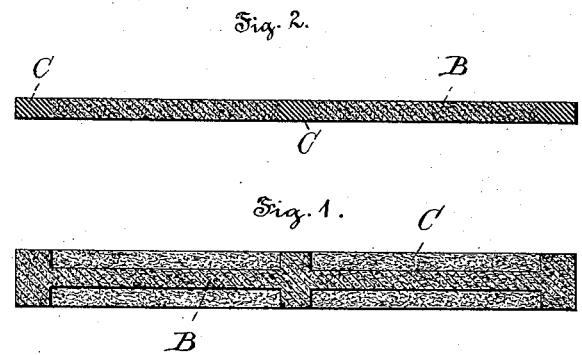
Witnesses:
Hermann Bormann.
Thomas M. Smith.
Inventor:
Stanley C. C. Currie,
by J. Walter Douglass.
att'y.

UNITED STATES PATENT OFFICE.

STANLEY C. C. CURRIE, OF PHILADELPHIA, PENNSYLVANIA, ASSIGNOR TO THE UNITED GAS IMPROVEMENT COMPANY, OF SAME PLACE.

ELECTRODE FOR SECONDARY BATTERIES.

SPECIFICATION forming part of Letters Patent No. 444,392, dated January 6, 1891.

Application filed June 10, 1890. Serial No. 354,908. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in the Plates or Elements of a Secondary or Storage Battery, of which the following is a specification.

Heretofore it has been customary to support the active material or material to become active by means of separate supports in various ways, among which the following may be enumerated: first, by surrounding the plate with a more or less rigid frame; second, by providing one or more separate interior bifurcated or forked supports of conducting material; third, by painting, pasting, or cementing the active material or material to become active upon a separate support of conducting material; fourth, by providing a separate perforated central support and packing the active material or material to become active in the interstices thereof, and, fifth, by employing a combination of these methods. Although the above-described methods of supporting the active material or material to become active were in practice more or less efficient, still their cost, as well as certain inherent and well-understood mechanical and electrical disadvantages, precluded their general employment.

The principal objects of my invention are, first, to dispense with the employment of separate frames, central supports, &c., for supporting the active material or material to become active, and, second, to provide an inexpensive, efficient, and durable means for supporting the active material or material to become active formed integral with the plate or element.

In my invention the plates or elements of porous active material or material to become active are provided at the edges or at other parts or portions thereof with flanges or enlarged portions of like material, and these flanges or enlarged portions of the plates or elements are compressed and rendered compact and dense, as is hereinafter more fully described.

The nature and characteristic features of my invention will be more fully understood by reference to the accompanying drawings, forming part hereof, and in which—

Figure 1 is an elevational view of a battery plate or element embodying my invention and showing the compact and dense portions arranged around the periphery and across the surfaces thereof for supporting the active material or material to become active. Fig. 2 is a similar view of a battery plate or element after having undergone the compression-stage of the process for rendering the same tough and dense as an integral support for the plate or element; and Fig. 3 is a transverse sectional view of a battery plate or element, showing the porous or active material or material to become active and the integral portions of the plate or element before being compressed and rendered dense to form the support for the active material or material to become active of the plate or element, as shown in Figs. 1 and 2.

Referring to the drawings, A is a plate or element especially adapted for use in connection with a secondary or storage battery.

B is the porous active material or material to become active of the plate or element.

C are the compact and dense parts or portions of the plate or element for supporting the active material or material to become active. In the present instance the dense portions C of the rectangular-shaped plate or element are arranged around the perimeter and parallel to the sides or edges thereof; but it will be readily understood that the compressed and dense portions C of the plate or element A may, if preferred, be disposed in any other required manner—for example, around the edges and diagonally across the plate or element.

For the sake of a further description of my invention, a brief description of the method of making a plate or element according to my invention will now be given.

The active material or material to become active, preferably pure lead or other suitable compound, is formed into a porous plate having enlarged or flanged portions around the edges and across the surface thereof. This result may be accomplished by molding the material or materials in the usual or any preferred manner. However, good results have been attained in practice by melting a compound of lead—for example, chloride of lead or chloride of lead and zinc together—and then casting the mass in suitable molds adapted to form the enlarged or flanged portions as well as the lug, and the cast mass is then reduced by chemical or electrolytic action, or both, to a porous metallic state. The porous plates having enlarged or flanged parts or portions are then placed between dies adapted to forge or compress and render the flanges or enlarged portions thereof dense without in any wise affecting the other portions of the plate or element. Of course, instead of using dies, the flanged or enlarged parts or portions of the plate or element may be compressed in any other preferred manner. After the enlarged or flanged parts or portions of the plate or element, together with the lug D, are sufficiently compressed and rendered dense, the latter may be readily fitted for use as a binding-post in the usual or in any other preferred manner. The parts or portions of the plates or elements which are compressed are rendered tough and dense, and as a consequence not only firmly support the active material or material to become active, but also afford an efficient electrical connection between the conductors and the active material or material to become active.

Having thus described the nature and objects of my invention, what I claim as new, and desire to secure by Letters Patent, is—

The herein-described battery plate or element, composed of the salt or salts of a metal or metals provided with an integral tough and compact or dense supporting-rim of the same material or materials, but distinguishable from the active portion of the plate or element.

In witness whereof I have hereunto set my signature in the presence of two subscribing witnesses.

STANLEY C. C. CURRIE.

Witnesses:
OTIS EGAN,
F. H. MACMORRIS.